(12) United States Patent  
Kochanczyk (10) Patent No.: US 10,032,447 B1
(45) Date of Patent: Jul. 24, 2018

(54) SYSTEM AND METHOD FOR MANIPULATING AUDIO DATA IN VIEW OF CORRESPONDING VISUAL DATA

(71) Applicant: John Mitchell Kochanczyk, Dubai (AE)

(72) Inventor: John Mitchell Kochanczyk, Dubai (AE)

( * ) Notice: Subject to any disclaimer, the term of this patent is extended or adjusted under 35 U.S.C. 154(b) by 0 days.

(21) Appl. No.: 14/534,278

(22) Filed: Nov. 6, 2014

(51) Int. Cl.
*G10K 15/08* (2006.01)
*G11B 27/031* (2006.01)
*G11B 20/10* (2006.01)
*G11B 27/022* (2006.01)

(52) U.S. Cl.
CPC ............ *G10K 15/08* (2013.01); *G11B 27/022* (2013.01); *G11B 27/031* (2013.01); *G11B 2020/10555* (2013.01)

(58) Field of Classification Search
CPC ................. G10K 15/08; G11B 27/031; G11B 2020/10555
USPC ................................................ 386/278–291
See application file for complete search history.

(56) References Cited

U.S. PATENT DOCUMENTS

| 7,606,372 | B2 * | 10/2009 | Melchior | H04N 5/2224 352/11 |
| 7,774,707 | B2 * | 8/2010 | Sim | G10H 1/0066 715/727 |
| 8,937,620 | B1 * | 1/2015 | Teller | G06T 13/80 345/467 |
| 9,679,215 | B2 * | 6/2017 | Holz | G06K 9/2036 |
| 2002/0103553 | A1 * | 8/2002 | Phillips | H04S 3/00 700/94 |
| 2002/0181721 | A1 * | 12/2002 | Sugiyama | G01H 3/00 381/92 |
| 2004/0119889 | A1 * | 6/2004 | Ogata | G10L 21/00 348/515 |
| 2008/0098032 | A1 * | 4/2008 | Wu | G11B 27/034 |
| 2010/0014693 | A1 * | 1/2010 | Park | G06Q 30/0601 381/119 |
| 2010/0076577 | A1 * | 3/2010 | Lee | G10L 19/008 700/94 |
| 2012/0133748 | A1 * | 5/2012 | Chung | H04N 13/0022 348/51 |
| 2012/0224700 | A1 * | 9/2012 | Nakagawa | H04S 1/005 381/17 |
| 2013/0050260 | A1 * | 2/2013 | Reitan | G06F 3/011 345/633 |
| 2013/0265502 | A1 * | 10/2013 | Huebner | A63F 13/06 348/789 |
| 2014/0063061 | A1 * | 3/2014 | Reitan | G09G 3/003 345/633 |
| 2014/0198945 | A1 * | 7/2014 | Hsiao | G06T 7/2033 382/103 |

(Continued)

*Primary Examiner* — Gelek W Topgyal
(74) *Attorney, Agent, or Firm* — Michael D. Eisenberg (57) ABSTRACT

An aspect of some embodiments of the present invention relates to a system for processing audiovisual data. The system is configured to mediate between a user and an audio post-processing system, to enable the user to easily assign sounds to corresponding objects in a scene and for selecting suitable sounds effects to be applied to desired sounds by the post-processing system. Optionally, the sounds effects are selected according to distances between the objects and the camera and/or distances between objects in the scene with other objects which may or may not be in the scene.

20 Claims, 6 Drawing Sheets

(56) References Cited

U.S. PATENT DOCUMENTS

| | | | |
|---|---|---|---|
| 2014/0257532 A1* | 9/2014 | Kim | G05B 15/02 |
| | | | 700/90 |
| 2014/0369506 A1* | 12/2014 | Arrasvuori | G01S 3/8083 |
| | | | 381/17 |
| 2015/0040074 A1* | 2/2015 | Hofmann | G06T 19/006 |
| | | | 715/852 |
| 2015/0067514 A1* | 3/2015 | Lewis | G11B 27/031 |
| | | | 715/720 |
| 2015/0131966 A1* | 5/2015 | Zurek | H04S 3/008 |
| | | | 386/241 |
| 2015/0245153 A1* | 8/2015 | Malak | H03G 7/00 |
| | | | 381/57 |
| 2015/0334502 A1* | 11/2015 | Watanabe | H04S 7/30 |
| | | | 381/300 |
| 2016/0080684 A1* | 3/2016 | Farrell | H04N 5/77 |
| | | | 386/227 |

* cited by examiner

SYSTEM AND METHOD FOR MANIPULATING AUDIO DATA IN VIEW OF CORRESPONDING VISUAL DATA

TECHNICAL FIELD

The present invention, in some embodiments thereof, relates to hardware and/or software systems for visual and acoustic media creation.

BACKGROUND OF THE INVENTION

Current technologies in the field of re-creation, manipulation, and presentation of acoustic data have progressed substantially in the recent times. This progress, however, has been accompanied by the growing complexity of hardware and/or software systems/tools configured for enabling users to manipulate acoustic data. This complexity has increased the time and effort required by a user to learn the tools and adequately take full advantage of the technologies, methodologies and artistic capacities. Therefore, the complexity of the tools for the manipulation of acoustic data may prevent users from fully utilizing the users' artistic ability.

Common tools for manipulating acoustic data includes software and/or hardware tools, such as Avid Pro Tools, Avid Media Composer, Adobe Premier Pro, Adobe Audition, Apple Final Cut Pro, Apple Soundtrack pro, Steinberg Cubase, and Steinberg Nuendo. Each of these tools offers a plurality of options for audio editing. Each of these tools has its respective user interface. Therefore a user's expertise in one of these tools does not imply that the user is proficient in any one of the other tools.

When it comes to the post production phase of audiovisual assets, the complexity of acoustical presentations grows, as the audio data is to be synchronized with the video data through a multitude of viewing mediums and audio formats.

BRIEF SUMMARY OF EMBODIMENTS OF THE INVENTION

The present invention aims at decreasing the difficulty in the use of software and/or hardware configured for the post production of audiovisual media.

An aspect of some embodiments of the present invention relates to a software and/or hardware system configured for enabling a user to utilize features of post-production tools/systems without extensive knowledge of the tools/systems used. In some embodiments of the present invention, the system of the present invention is in the form of an application programming interface (API) or a software plugin which is configured for connecting to any one of a plurality of post-production systems. The API includes a single simplified user interface (UI) which provides a graphical image of the camera and the position of one or more objects with respect to the camera. The user interface enables the user to assign sounds to objects and to instruct any of the plurality of post-production systems to add different effects to the sounds assigned to the objects.

An aspect of some embodiments of the present invention relates to a system for processing audiovisual data. The system includes an object recognition module, an image creation module, an output module, an audiovisual synchronization module, an audio manipulation module, a communication unit, and an input module. The object recognition module is configured for receiving a visual data stream indicative of a plurality of frames of a scene captured by a camera, for processing the visual data stream to identify one or more objects in the scene in at least some frames, and for outputting first processed data indicative of a position of each of the one or more objects with respect to the camera at the at least some frames. The image creation module is configured for receiving the first processed data and for processing the first processed data to generate image data. The output module is configured for receiving the image data, and for transmitting the image data to a display to cause the display to show an image which depicts each object at a respective position. The audiovisual synchronization module is configured for receiving an audio data stream corresponding to the visual data stream and the first processed data, for extracting from the audio data stream one or more identifiers corresponding to respective sounds, for assigning each sound to a respective object according to first commands from a user, and for outputting second processed data indicative of a correspondence between each object and each assigned sound. The audio manipulation module configured for receiving the second processed data, for selecting one or more audio effects to be applied to each assigned sound based on a position of the sound's respective object, and for outputting a first list comprising the one or more assigned sounds and a corresponding second list comprising the one or more selected effects to be applied to the one or more sounds of the first list. The communication unit, configured for receiving the first and second lists and for outputting a set of instructions configured for causing an audio post-product system to apply the one or more selected effects to the one or more assigned sounds. The input module, configured for receiving a first input from the user, for outputting the first command according to the first input, and for transmitting the first command to the audiovisual synchronization module.

Optionally, the object recognition module is further configured to operate according to a second command of the user, and the input module is further configured for receiving a second input from the user, and to transmit the second command to the object recognition module according to the second input.

In a variant, the input module is configured for enabling the user to mark one or more objects in one or more frames and to instruct the object recognition module to track the one or more marked objects.

In another variant, the input module is configured for enabling the user to mark at least one of the one or more objects identified by the object recognition module as uninteresting, and for instructing the object recognition module to delete or prevent the output of data relating the uninteresting objects.

In a further variant, the object recognition module is configured to operate automatically.

In yet another variant, the audio manipulation module is configured for automatically selecting the one or more effects according to one or more predetermined criteria.

In yet another variant, the audio manipulation module is configured for selecting the one or more effects according to a third command, while the input module is further configured for receiving a third input from the user, and to transmit the third command to the audio manipulation module according to the third input.

In a variant, the input module is configured for receiving a fifth input from the user, the fifth input being indicative of a position of at least one background or foreground object that is outside the scene. The audio manipulation module is configured for selecting the one or more effects to be applied to the assigned sound corresponding to the at least one object based on a distance between the at least one object and the at least one background or foreground objects.

Optionally, the background or foreground object comprises a wall and the one or more effects comprises reverb and/or echo.

In another variant, the audio manipulation module is further configured for accepting a third data stream which comprises data indicative of positional information of a background or foreground object that is outside the scene. The audio manipulation module is further configured for selecting the one or more effects to be applied to the assigned sound corresponding to the at least one object based on a distance between the at least one object and the background or foreground objects.

Optionally, the background or foreground object comprises a wall and the one or more effects comprise reverb and/or echo.

In a further variant, at least one of the first processed data, second processed data, the first list, the second list, and the set of instructions are in Extensible Markup Language (XML) format and/or in Event Driven Language (EDL) format.

In yet another variant, the output module is configured for communicating with an output device configured for projecting a three-dimensional cube, and for causing the output device to project a three-dimensional image according to the first processed data. The input module is configured for communicating with an input device configured for tracking the user's hand or hands within the three-dimensional cube, and for receiving data from the input device as the first input.

In yet a further variant, the visual data stream comprises information indicative of at least one characteristic of the camera in at least some of the frames, the at least one characteristic comprising at least one of: position, height, tilt, pan, roll, pitch, yaw, motion, orientation, field of view.

Optionally, the first processed data comprises the information indicative of the at least one characteristic of the camera, the image data comprises the information indicative of the at least one characteristic of the camera, and the output module is configured for transmitting the image data to the display to cause the display to show the image which depicts each object at a respective position and the camera according to the at least one characteristic.

In a variant, the system is an application programming interface (API) or plugin configured for communicating with the audio post-production software and/or hardware system, such that any input from the user to the audio post-production system is mediated by the system.

In another variant, the audio manipulation module is configured for selecting the one or more audio effects to any given assigned sound corresponding to any given object depending on a distance between the given object and one or more other objects in the scene.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Before describing aspects of the present invention, it is necessary to define a term that will be used in the current application. The words "audio", "acoustic", and "sound" are used interchangeably when used as adjectives. For example, the term "audio effects" is interchangeable with "acoustic effects" and "sound effects". Similarly, the term "audio data" is interchangeable with "acoustic data" and "sound data", and refers to data in electronic format that is created from a recorded sound and can be converted back to sound.

Figure 1:
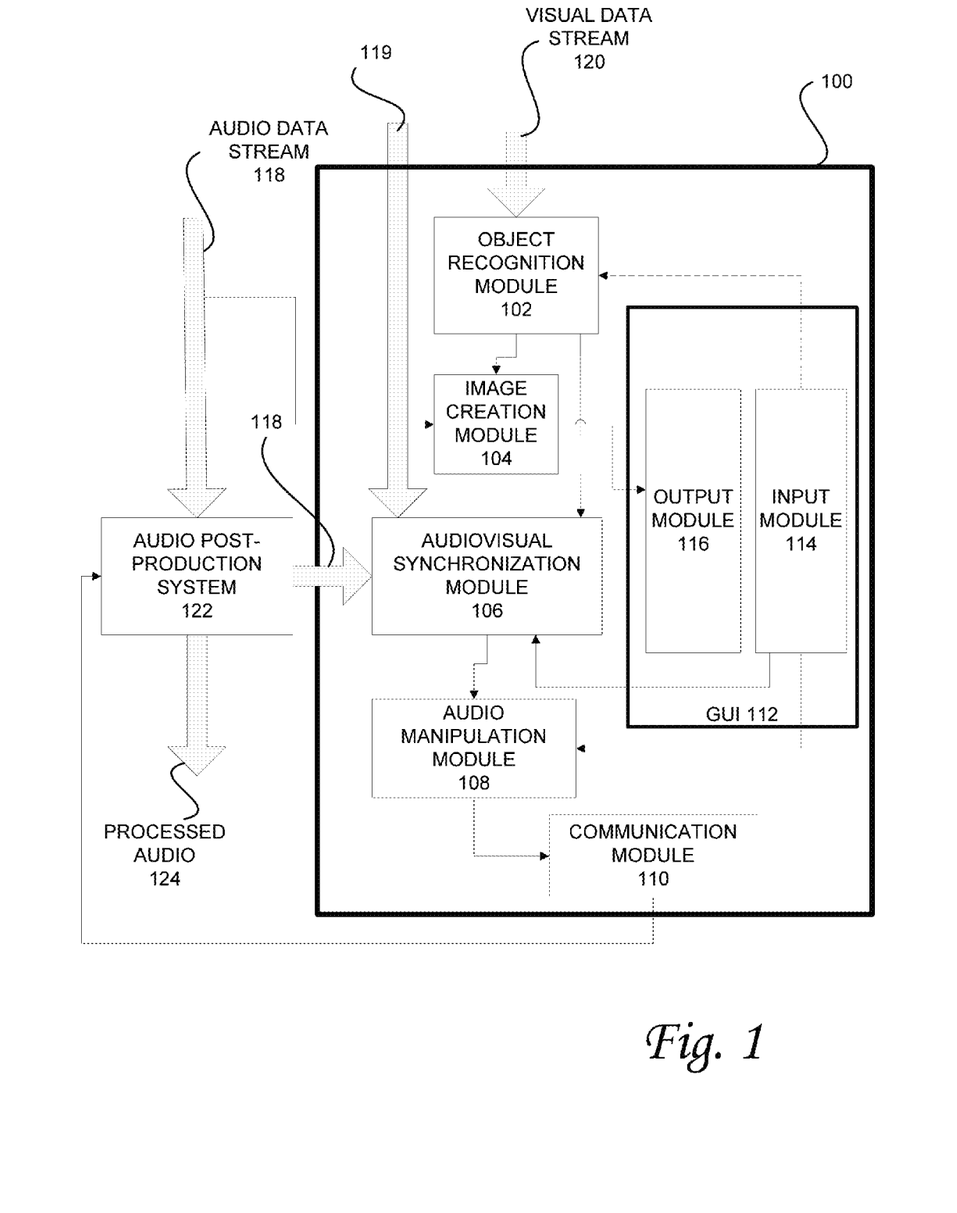
FIG. 1 is a box diagram illustrating a system of the present invention for facilitating the use of audiovisual post-production software and/or hardware tools.

Referring now to the drawings, FIG. 1 is a box diagram illustrating a system 100 of the present invention for facilitating the use of audiovisual post-production software and/or hardware tools.

The system 100 of the present invention includes an object recognition module 102, an image creation module 104, an audiovisual synchronization module 106, an audio manipulation module 108, a communication module 110 and a graphical user interface (GUI) 112 having an input module 114 and an output module 116.

The system 100 receives two data streams: an audio data stream 118 and a visual data stream 120. The audio data stream 118 includes data indicative of one or more sounds that are to be assigned to one or more objects in a scene. The visual data stream 120 includes the position(s) of one or more objects captured by a real or virtual camera, field of view information captured from the chosen video lens in use, focus lens data (i.e. the focal length of the camera lens, and what the focus of the lens is set to), timecode data. Timecode data is a numerical code which is generated at the specified frame rate/interval (for example, 25 fps (frames per second) PAL, 29.97 fps NTSC) and includes a 24 hour clock with the frame number information applicable to each frame of the recorded video or audio. For example, 15:29:30:14 indicates a video captured at 3:29 pm and 30 seconds and having 14 frames elapsed. Timecode data may also contain a small number of 'user bits' which can store 8 fields of alphanumerical data ranging from 0-9 & a-f. The most common formats utilized in film and television are Linear Timecode (LTC), Vertical Interval Timecode (VITC), and MIDI Timecode, data relating to the aperture of the camera's lens, data relating to the camera's position, orientation, and movement (e.g., camera height, camera tilt degrees, camera pan degrees, camera movement data, i.e. XYZ coordinates of how the camera is moving). The audio data may be indicative of audio recorded simultaneously to the capture of the scene, or audio recorded in a studio that is to be assigned to the scene.

The object recognition module 102 is configured for receiving the visual data stream 120, and processing the visual data stream in order to recognize objects in the scene in at least some frames, and optionally at each captured frame. The object recognition module 102 further processes the visual data stream to calculate the position(s) of the recognized object(s) with respect to the camera at each captured frame. The object recognition module 102 outputs first processed data indicative the positions of one or more objects with respect to the camera at each frame.

The image creation module 104 is configured for receiving the first processed data, and for processing the first processed data to generate image data. The image data is indicative of an image which includes representations of the captured objects at each frame and, optionally, a representation of the camera. If present, the representation of the camera may be used to visualize how the camera is positioned in a location and how objects move within the location, even when the objects are out of the camera's field of view. In this manner, the system of the present invention can be used for manipulating sound data indicative of sounds generated outside the camera's field of view. Also, the camera position may represent the best viewing position(s) for both the visual image and audio playback system in an movie theater or home entertainment system setup. The image data is sent to the output module 116 of the GUI 112. The output module of the GUI is configured communicating with a display, and for transmitting the image data to the display in order to cause the display to show the image. Optionally, the image is a three-dimensional image that can be rotated by the user.

In some embodiments of the present invention, the image creation module is configured for receiving at least some data from the audio data stream. For example, the image creation data may be configured for receiving file name(s) or other identifier(s) corresponding to respective sound(s), so as to generate a list of the available sounds in the image.

In some variants of the present invention, the object recognition module 102 is fully automatic. In other variants of the present invention the object recognition module supports user inputs via the GUI's input module 114. In such embodiments, the user may mark one or more objects in one or more frames, and instruct the object recognition module 102 to track the marked object(s) throughout the rest of the captured frames. Optionally, the input module 114 enables the user to mark one or more of the objects recognized by the object recognition module 102 as being uninteresting, and to instruct the object recognition module 102 delete or prevent the output of data relating the uninteresting objects in the first processed data pass. In this manner, the user is able to choose the objects of interest.

The audiovisual synchronization module 106 is configured for receiving the first processed data from the object recognition module 102, for receiving the audio data stream 118 and extracting therefrom one or more identifiers corresponding to respective sounds, and for enabling the user to assign different sounds to different objects of interest via the GUI. Optionally, the audio stream data is configured to be received by the audiovisual synchronization module 106 via the audio post-production system 122. Alternatively, the audio stream data is received without passing via the audio post-production system 122. The audiovisual synchronization module 106 is configured for receiving the user's instruction via the GUI and for processing the instruction and the input data, in order to output second processed data indicative of the correspondence between objects and their assigned sounds.

The audio manipulation module 108 is configured for receiving the second processed data from the audiovisual synchronization module 106 and for selecting audio manipulation effect to be applied on the one or more sounds of the audio data stream. Optionally, the audio manipulation module 108 is configured for automatically choosing one or more effects to apply to one or more sounds according to predetermined criteria. For example, the audio manipulation module may automatically assign different volumes to a sound corresponding to an object at each frame, depending on the position of the object at each frame. Similarly, the audio manipulation module may automatically assign different levels of reverb to a sound corresponding to an object at each frame, depending on the position of the object at each frame. Optionally or additionally, the audio manipulation module 108 is configured for enabling the user to choose one or more effects to be applied to chosen sounds via the GUI's input module 114. The audio manipulation module outputs a list comprising one or more sounds and a corresponding list of effects to be applied to the one or more sounds of the list. The output of the audio manipulation system is received by the communication module 110, and is converted by the communication module into instructions to the audio post-production system 122 to apply the desired effects to the desired sounds. The audio post-production system 106 receives the audio data stream 118 and processes the audio data stream according to the instructions output by the communication module 110. It should be noted that the audio data stream received by the audio post-production system 106 may be raw audio stream data, or audio stream data that has already been manipulated by the audio post-production system 122. The audio post-production system 122 outputs post-processed data 124, which may be input into a desired audio playback system (for example, industry standard stereo, 5.1, 7.1, Auro 3D audio, Dolby Atmos audio playback system etc).

Optionally, the audio manipulation module is configured for applying "adaptive reverb and/or echo". In this embodiment, the system 100 is configured for extrapolating the distances between each tracked object within the field of view of the real or virtual camera and the perceived "walls" of whatever space the video data is in, which may be out of the camera's field of view. In a variant, the position of the walls may be defined by the user via the UI. In another variant, the data stream (which may include the visual data or an additional data stream 119) may include data about walls and/or objects which are in or out of the camera's field of view, and affect the sound. The determination of the distance between walls and objects enables the audio manipulation module to add reverb and/or echo to a sound not only based on the distance of the sound source (object) from the camera, but also based on the object's distance from a wall or other object, which may or may not be within the camera's field of view.

In some embodiments of the present invention, the data exchanged between the various elements of the system 100 is in the form of one or more XML/EDL files. Optionally, the instruction output by the communication module is also in XML/EDL format. Currently, XML/EDL files are used in most workflows to keep track of positional references (time/timecode) for each video asset & audio asset which has to be inputted and modified/edited in one or more points on a timeline in a media editing platform. It should be noted that XML and EDL formats are described herein as non-limiting examples, and the data exchanged between the various elements of the system 100 and optionally the instruction output by the communication module may be in any other formats. These tracking XML/EDL files are usually used to exchange information between various post-production video & audio applications. In the present invention, the system 100 may be configured to create & modify these XML/EDL files to include additional information (for example, the positional/file name & start/end points of the live captured video, depth data, any CGI/visual effects based possibilities) to go alongside the normal video and associated audio data. This information is used to create the necessary depth-associated data for use in the system 100. The information may also be used to add any additional source information in order to increase the overall accuracy of the system 100. Such information may include, for example the camera's positional information in terms of tilt, pan, movement, and height, and optionally positional data of objects that reflect sound (as explained above).

It should be specified that this additional XML/EDL appended data format also has applications that rest outside of audio only applications, such as the ability for the system 100 to prepare this depth information for third party applications. An example of a third party application that may benefit from the data in the XML/EDL files may be an application used for color grading. Color grading is the manipulation of colors in a video. In a film, daytime scenes, nighttime scenes, indoor scenes, and outdoor scenes may be present. All of these scenes have respective color temperatures and white balances. Even shots within the same room may have different color temperatures or white balances. Color grading may be used to smooth out the differences in color temperatures, to eliminate jumps in brightness or shadows or skin tone etc between different shots, thus giving the appearance that all the shots were performed consecutively. Moreover, color grading may be used to develop emotional cues for the audience. For example, keeping the colors in a room or scene "warm" may convey the feeling of happiness. In contrast, dark and "cool" colors may be used to give a feeling of fear, for example during scenes in which an evil character appears.

The XML/EDL appended data format may be useful in a color grading environment. The depth information, alongside the XML/EDL, can be loaded into the color grading software of choice and be used to control the individual components of a frame/field of view, based upon the distance the object is away from the camera. For example, knowing the distance of objects from the camera may be used to target specific objects for coloring with a high degree of precision. Objects that are at different distances from the camera may be targeted individually and be separately colored, according to the distance from the camera. Examples of color grading tools currently used in the film industry include Filmlight Baselight, Blackmagic Design DaVinci Resolve, Adobe SpeedGrade, Sony Vegas, Apple Color, Autodesk Lustre, Nucoda Film Master, Mistika, Assimilate Scratch, and DVS Clipster.

It should be noted that the input module of the GUI may be configured for communicating with one or more input/pointing devices, such as a keyboard, and/or a mouse, and/or a hardware/software system which allows for the control of various computer commands in a variety of input mediums such as a 3D cube which is projected and captured via infrared light and allows for the tracking of a user's hands in real-time. The latter device is very sensitive to subtle motions of the user's hands/fingers, and allows accurate control of the user's actions. An example of the latter device is called "Leap Motion".

In some embodiments of the present invention a single instance of the system 100 is configured for tracking several objects concurrently and for assigning sounds and sounds effects to the several objects. Alternatively, several instances of the system 100 may be run together, such that each instance of the system 100 is configured for tracking a respective object and for assigning sounds and sounds effects to the respective object.

Figure 2:
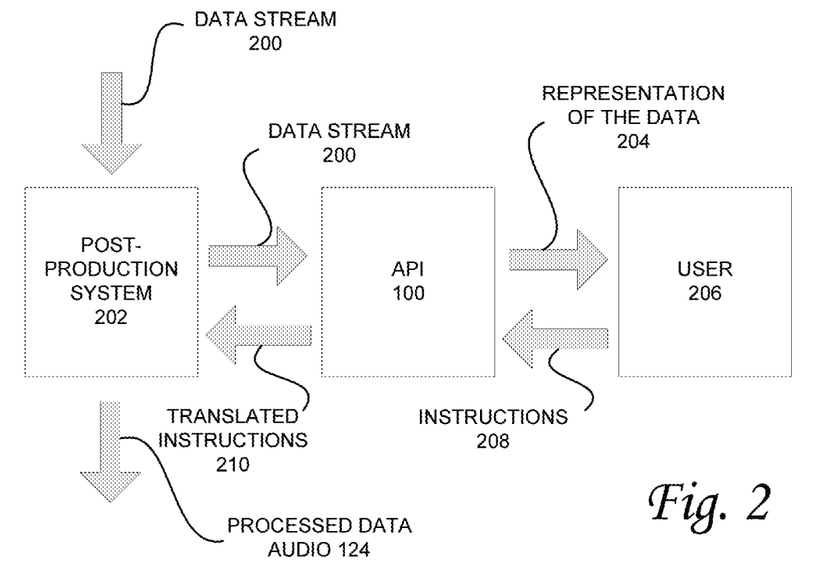
FIGS. 2-3 are box diagrams illustrating a manner in which the system of the present invention is configured for enabling a user to access a post-production tool.
Figure 3:
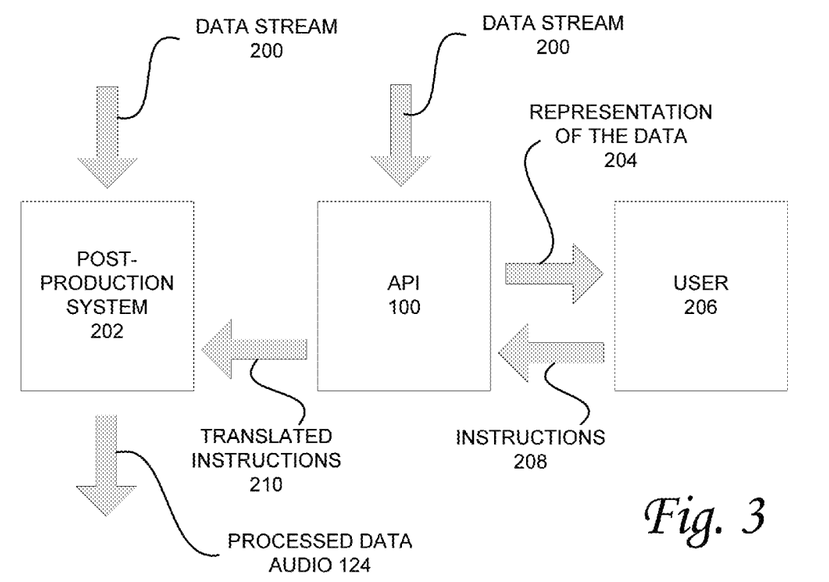

Reference is now made to FIGS. 2-3, which are box diagrams illustrating two manner in which the system of the present invention is configured for enabling a user to access a post-production tool.

In FIG. 2, the data stream 200, which contains an audio data stream, a visual data stream and optionally an additional data stream include data about walls and/or objects with which the sound interacts, is received by a post-production system 202. The post-production system 202 transmits the audiovisual data 200 to the system of the present invention 100—which may be in the form of an API or plugin, as seen in the non-limiting example of FIGS. 2-3. The system 100 processes the data 200 and outputs data 204 indicative of an image or representation of the data 200. More specifically, the data 204 output by the system 100 includes image data showing the positions of objects and optionally of the camera at each frame. The data 204 is converted to an image by a display and is displayed to the user 206. The user 206 inputs at least one instruction 208. The instruction includes a first instruction set for assigning one or more sounds to respective objects and a second instruction set for applying one or more effects to different sounds of the audio stream.

Optionally, the generation of the second instruction set is automated and does not require the user's input. The system 100 receives the at least one instruction 208 and optionally automatically generates a second instruction set for applying one or more effects to respective sounds of the audio stream. The received and generated (if present) instructions relating to the application of the effects to respective sounds are processed and the system 100 outputs one or more translated instructions 210 in a format that suitable for the post-production system 202. The one or more translated instructions 210 cause the post-production system 202 to apply the desired one or more effects to the respective one or more sounds to and output processed audio data 124 which is configured for being paired to the respective visual data.

The box diagram of FIG. 3 illustrates a different mode of operation that is similar to that shown in FIG. 2. In the mode of operation of FIG. 3, the data stream is received by both the system 100 and the post-production system 202.

Figure 4:
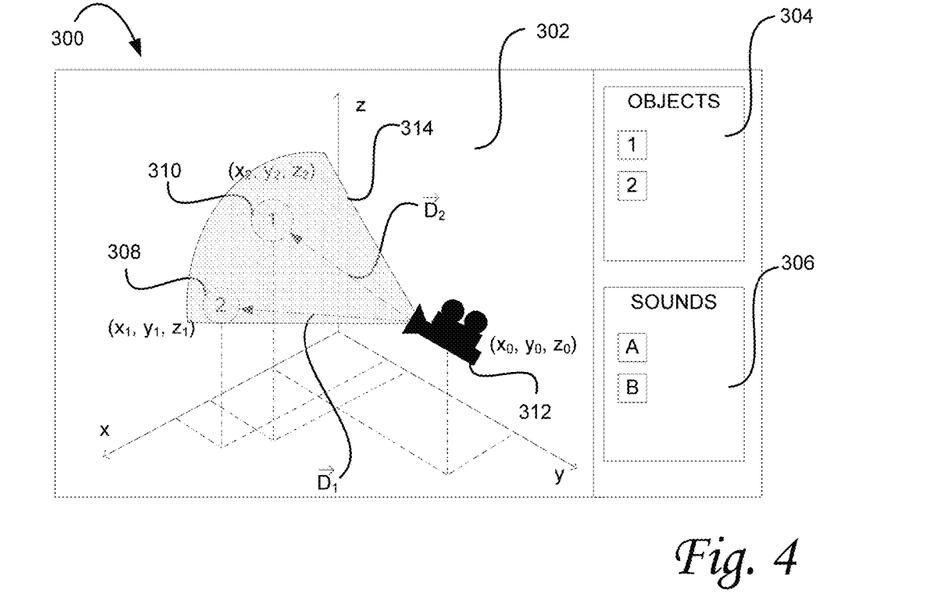
FIG. 4 illustrates and example of an image constructed by the system of the present invention to enable the user to assign sounds to different objects in a scene.

FIG. 4 illustrates an example of an image constructed by the system of the present invention to enable the user to assign sounds to different objects in a scene.

The screenshot 300 includes a first window 302, a second window 304, and a third window 306. The first window 304 includes an image of one or more objects recognized by the object recognition module. The image may be three-dimensional (enabling the user to view the image from different angles) or two-dimensional. In the non-limiting example of FIG. 4, the image includes a first representation 308 of a first object, a second representation 310 of a second object, a representation of a distance vector $D_1$ between the first object and the camera, and a representation of a distance vector $D_2$ between the second object and the camera. In some embodiments the representations of the vectors $D_1$ and $D_2$ are not shown. Optionally, a third representation 312 of the camera is also depicted. Optionally, a representation 314 of the camera's field of view is also depicted. It should be noted that for each frame captured by the camera, the positions of the first and second representations, the position of the camera's representation, the orientation of the camera's rotation (roll, pitch, yaw), and the position and orientation of the representation of the camera's field of view may change.

The second window 304 includes a list of the objects represented in the image of the first window 302. In the non-limiting example of FIG. 4, two objects are present and are identified as object 1 and object 2. The third window 306 includes a list of the sounds included in the audio stream. In the non-limiting example of FIG. 4, two sounds are present and are identified as sound A and sound B. The screenshot 300 enables the user to easily visualize the different object and easily choose the sounds to assign to each object.

FIGS. 5-8 illustrate a non-limiting example of a manner in which a sound and an effect is assigned to a desired object, according to some embodiments of the present invention.

Figure 5:
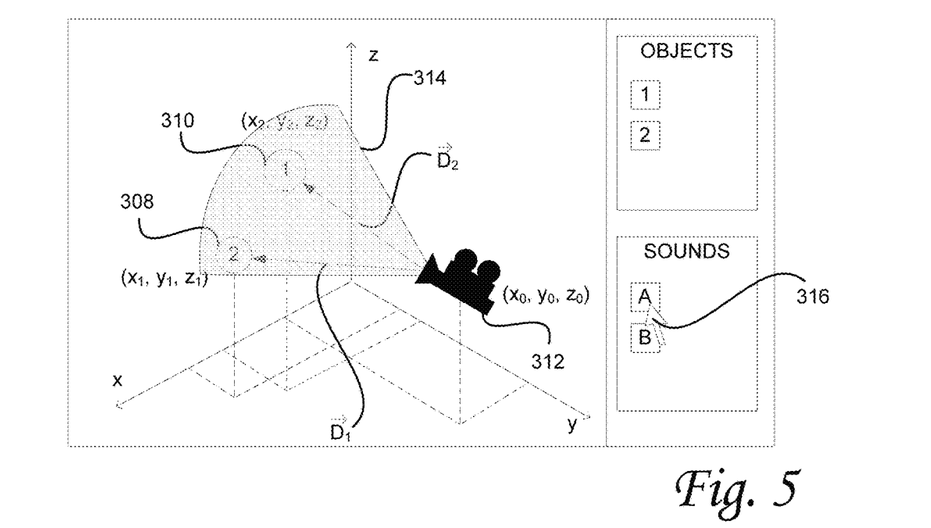
FIGS. 5-8 illustrate a non-limiting example of a manner in which a sound and an effect is assigned to a desired object, according to some embodiments of the present invention.
Figure 6:
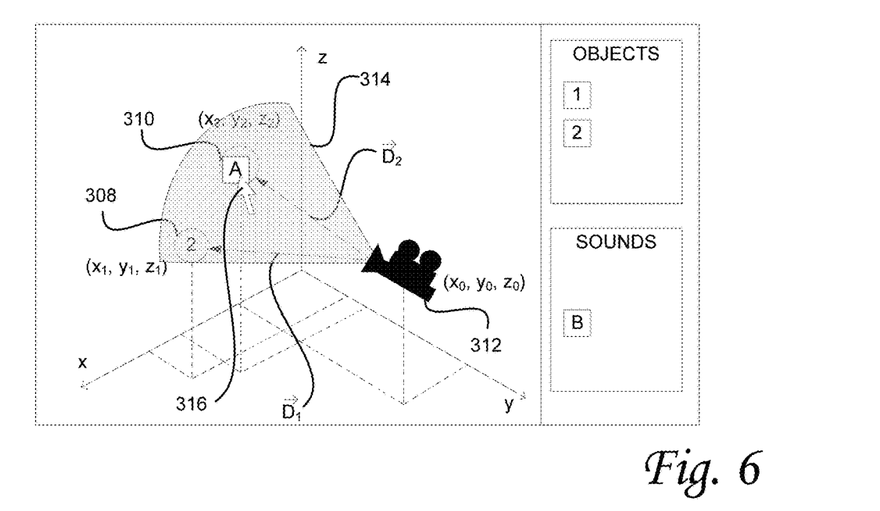
Figure 7:
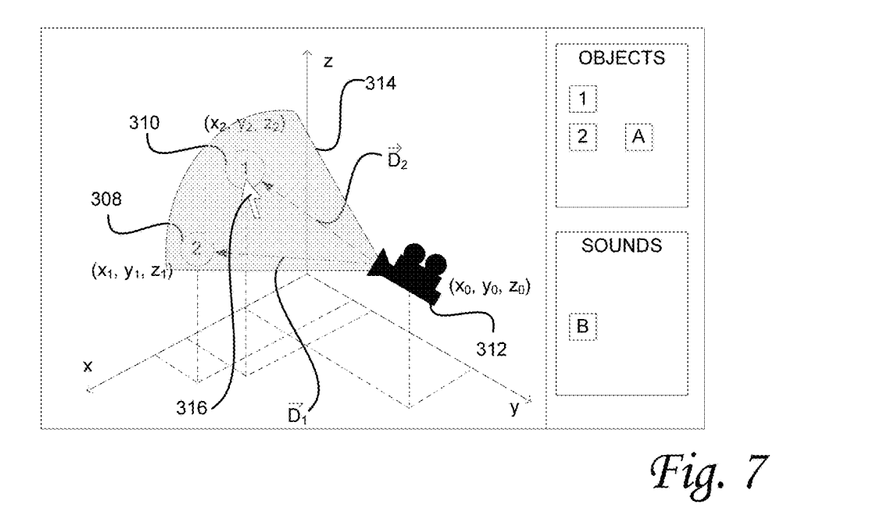

In this non-limiting example, a user wishes to assign sound A to object 2. A cursor 316 is included in the image in order to enable the user to manipulate various elements of the image. In FIG. 5, the user places the pointer on an icon representing the sound A. In FIG. 6, the user drags the icon representing the sound A to the representation of desired object (object 2, 310) on the image of the first window 302 of the screenshot. In FIG. 7, the user releases the pointer putting an end to the dragging of the icon. In response, the second window 304 of the screenshot it updated by showing the icon of the sound A next to the listing of object 2. When the user has finished assigning the sounds, the sound pairings are saved and transmitted by the audiovisual synchronization module to the audio manipulation module, as described above.

Figure 8:
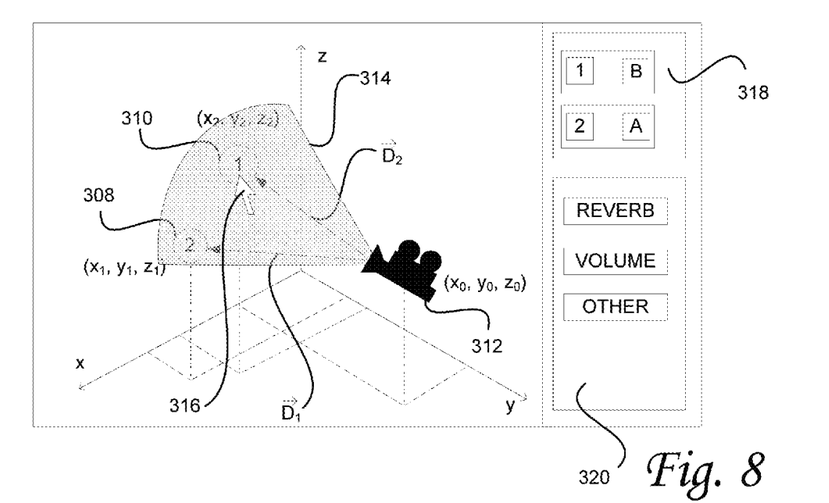

In some embodiments of the present invention, the system of the present invention enables the user to choose the effects to apply to the sounds. In FIG. 8, after the sounds have been assigned, the lists of second and third window are replaced by a fourth window 318 and a fifth window 320. The fourth window shows a list the sound-object assignments, while the fifth window shows a list of available effects that can be applied. In a non-limiting example, an effect may be applied to a sound by dragging an icon representing the desired effect from the fifth window 320 to the desired sound on the fourth window 318. Optionally more windows may be present to enable the user to control the characteristics of the chosen effects. Once the effects have been assigned, the audio manipulation module 108 of FIG. 1 generates instructions for the audio post-production system to apply the desired effects to the respective sounds. These instructions are passed on to the communication module 110, which translates the instruction to a form suitable for the post-production system.

Figure 9:
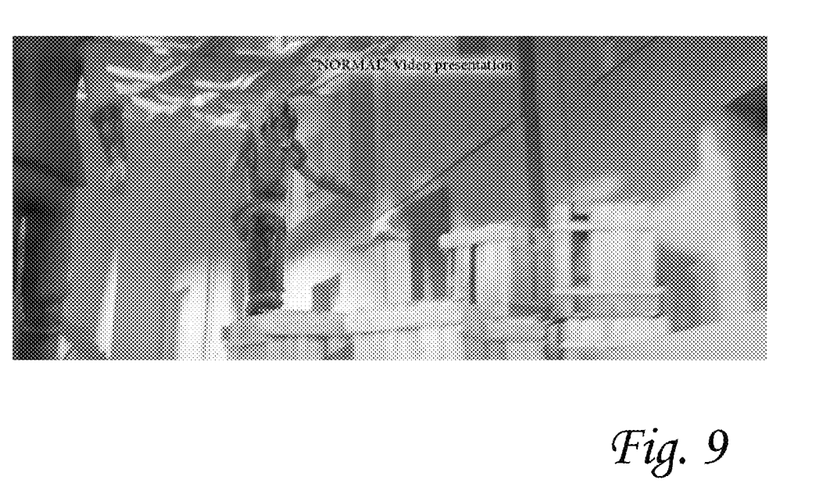
FIGS. 9-11 illustrate the use of different data pieces in the system of the present invention, for generating realistic sound.
Figure 10:
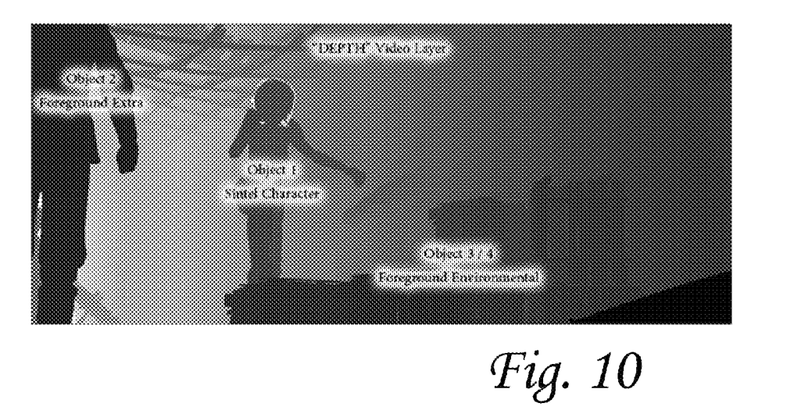
Figure 11:
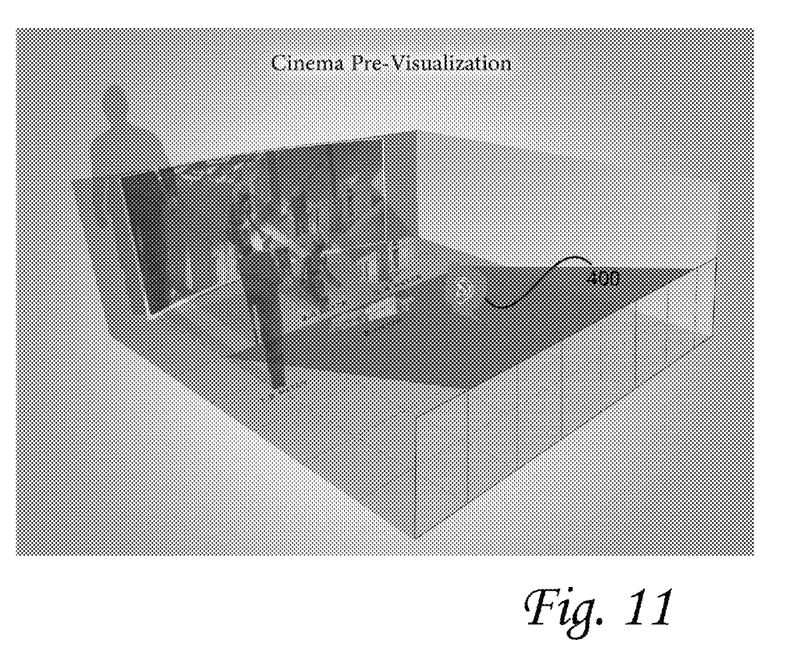

FIGS. 9-11 illustrate the use of different data pieces in the system of the present invention, for generating realistic sound. FIG. 9 is a still captured from a short animated film. This still illustrates a typical 'normal' viewing scenario, where the viewer is presented with moving visuals on screen. FIG. 10 is a still image captured from the same short animated film showing the 'depth' characteristics of what is viewable on screen. It is a gradated color scale where 100% black equals 0 meters distance from the camera, and 100% white equals 20 meters distance from the camera. This depth data is applied to the objects identified by the object recognition module of the present invention, where object 1 is a character named Sintel, object 2 is a character (extra) on the foreground, and objects 3 and 4 are crates that form foreground environmental objects. Using this data, the system of the present invention generates instructions to an audio post-production system, to cause the audio post-production system to apply appropriate sound effects to different sounds. In this manner, a viewer in a cinema can feel sound being generated at appropriate distances. This can be seen in FIG. 11, which shows the viewer 400 and projections of sounds from different objects in the scene. For example, the sound effects applied on the sounds associated with object 1 (Sintel) make it appear that Sintel is about 3.4 meters from the user. Similarly, sounds effects associated with object 2 make it appear that the foreground character is at 1.3 meters from the viewer, to the viewer's left. Moreover, the sound associated with Sintel interacts with the crates (objects 3 and 4) which are at 3.4 meters and 2 meters away from the camera. Suitable effects can be applied to the sound associated with Sintel to simulate the echo/reverb/dampening of Sintel's sound caused by the sound's interaction with the crates & the environment.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for processing audiovisual data, the system comprising:

an object recognition module configured for receiving a visual data stream indicative of a plurality of frames of a scene captured by a camera, for processing the visual data stream to identify one or more objects in the scene in at least some frames, and for outputting first processed data indicative of a position of each of the one or more objects with respect to the camera at the at least some frames;

an image creation module, configured for receiving the first processed data and for processing the first processed data to generate image data for the at least some frames;

a graphical user interface (GUI) module comprising:

an output module, configured for receiving the image data, and for transmitting the image data to a display to cause the display to show a graphical image indicative of and different from the scene in the at least some frames, the graphical image depicting a graphical representation of each object at a respective position; and an input module, for enabling the user to interact with the graphical image, for receiving a first input from the user's interaction with the graphical image, and for outputting a first command according to the first input;

an audiovisual synchronization module, configured for receiving an audio data stream corresponding to the visual data stream and the first processed data, for extracting from the audio data stream one or more identifiers corresponding to respective sounds, for receiving the first command, for assigning each sound to a respective object according to the first command from a user, and for outputting second processed data indicative of a correspondence between each object and each assigned sound;

an audio manipulation module configured for receiving the second processed data, for selecting one or more audio effects to be applied to each assigned sound based on a position of the sound's respective object, and for outputting a first list comprising the one or more assigned sounds and a corresponding second list comprising the one or more selected effects to be applied to the one or more sounds of the first list;

a communication unit, configured for receiving the first and second lists and for outputting a set of instructions configured for causing an audio post-product system to apply the one or more selected effects to the one or more assigned sounds; and wherein the output module is configured for communicating with an output device configured for projecting a three-dimensional shape, and for causing the output device to project a three-dimensional image according to the first processed data; and the input module is configured for communicating with an input device configured for tracking the user's hand or hands within the three-dimensional shape, and for receiving data from the input device as the first input.

2. The system of claim 1, wherein:
the object recognition module is further configured to operate according to a second command of the user; and
the input module is further configured for receiving a second input from the user, and to transmit the second command to the object recognition module according to the second input.

3. The system of claim 2, wherein the input module is configured for enabling the user to mark one or more objects in one or more frames and to instruct the object recognition module to track the one or more marked objects.

4. The system of claim 3, wherein the input module is configured for:
enabling the user to mark at least one of the one or more objects identified by the object recognition module as uninteresting;
instructing the object recognition module to delete or prevent the output of data relating the uninteresting objects.

5. The system of claim 1, wherein the object recognition module is configured to operate automatically.

6. The system of claim 1, wherein the audio manipulation module is configured for automatically selecting the one or more effects according to one or more predetermined criteria.

7. The system of claim 1, wherein:
the audio manipulation module is configured for selecting the one or more effects according to a third command; and
the input module is further configured for receiving a third input from the user, and to transmit the third command to the audio manipulation module according to the third input.

8. The system of claim 1, wherein:
the input module is configured for receiving a fifth input from the user, the fifth input being indicative of a position of at least one background or foreground object that is outside the scene; and
the audio manipulation module is configured for selecting the one or more effects to be applied to the assigned sound corresponding to the at least one object based on a distance between the at least one object and the at least one background or foreground objects.

9. The system of claim 8, wherein the background or foreground object comprises a wall and the one or more effects comprise reverb and/or echo.

10. The system of claim 1, wherein:
the audio manipulation module is further configured for accepting a third data stream which comprises data indicative of positional information of a background or foreground object that is outside the scene; and
the audio manipulation module is configured for selecting the one or more effects to be applied to the assigned sound corresponding to the at least one object based on a distance between the at least one object and the background or foreground objects.

11. The system of claim 10, wherein the background or foreground object comprise a wall and the one or more effects comprises reverb and/or echo.

12. The system of claim 1, wherein at least one of the first processed data, second processed data, the first list, the second list, and the set of instructions is in Extensible Markup Language (XML) format and/or in Event Driven Language (EDL) format.

13. The system of claim 1, wherein the three-dimensional shape is a cube.

14. The system of claim 1, wherein the visual data stream comprises information indicative of at least one characteristic of the camera in at least some of the frames, the at least one characteristic comprising at least one of: position, height, tilt, pan, roll, pitch, yaw, motion, orientation, field of view.

15. The system of claim 14, wherein:
the first processed data comprises the information indicative of the at least one characteristic of the camera;
the image data comprises the information indicative of the at least one characteristic of the camera; and
the output module is configured for transmitting the image data to the display to cause the display to show the image which depicts each object at a respective position and the camera according to the at least one characteristic.

16. The system of claim 1, wherein the system is an application programming interface (API) or plugin configured for communicating with the audio post-production software and/or hardware system, such that any input from the user to the audio post-production system is mediated by the system of claim 1.

17. The system of claim 1, wherein the audio manipulation module is configured for selecting the one or more audio effects to any given assigned sound corresponding to any given object depending on a distance between the given object and one or more other objects in the scene.

18. The system of claim 1, wherein the input module is configured for receiving instructions from the user to manipulate the graphical image and for transmitting the instructions to the output module causing the output module to change the graphical image.

19. The system of claim 1, wherein the graphical image is displayed as a three-dimensional view or a two-dimensional view.

20. A system for processing audiovisual data, the system comprising:
an object recognition module configured for receiving a visual data stream indicative of a plurality of frames of a scene captured by a camera, for processing the visual data stream to identify one or more objects in the scene in at least some frames, and for outputting first processed data indicative of a position of each of the one or more objects with respect to the camera at the at least some frames;
an image creation module, configured for receiving the first processed data and for processing the first processed data to generate image data for the at least some frames;
a graphical user interface (GUI) module comprising:
an output module, configured for receiving the image data, and for transmitting the image data to a display to cause the display to show a graphical image indicative of and different from the scene in the at least some frames, the graphical image depicting a graphical representation of each object at a respective position; and an input module, for enabling the user to interact with the graphical image, for receiving a first input from the user's interaction with the graphical image, and for outputting a first command according to the first input;

wherein the output module is configured for communicating with an output device configured for projecting a three-dimensional shape, and for causing the output device to project a three-dimensional image according to the first processed data; and the input module is configured for communicating with an input device configured for tracking the user's hand or hands within the three-dimensional shape, and for receiving data from the input device as the first input.

* * * * *